UNITED STATES PATENT OFFICE.

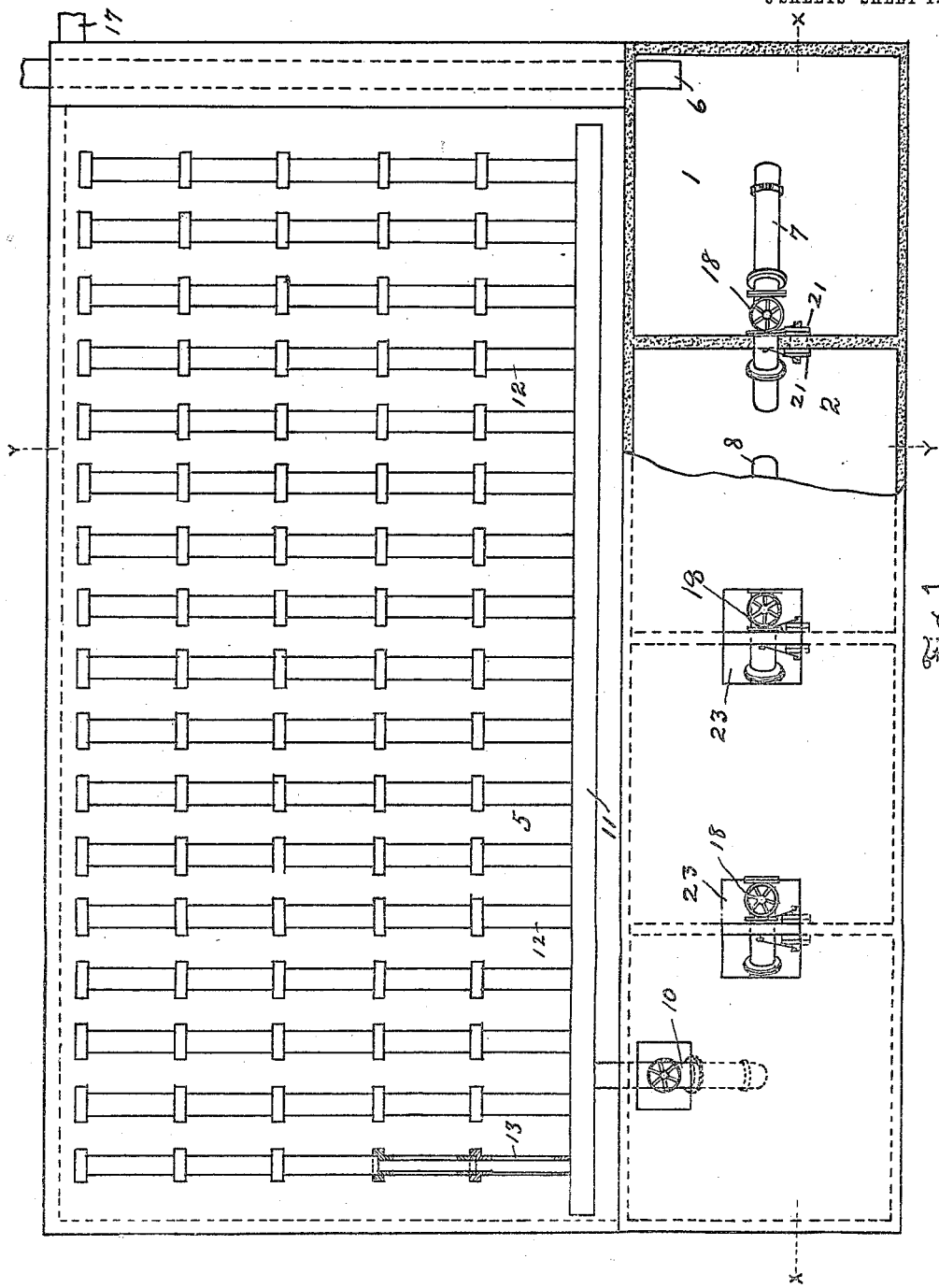

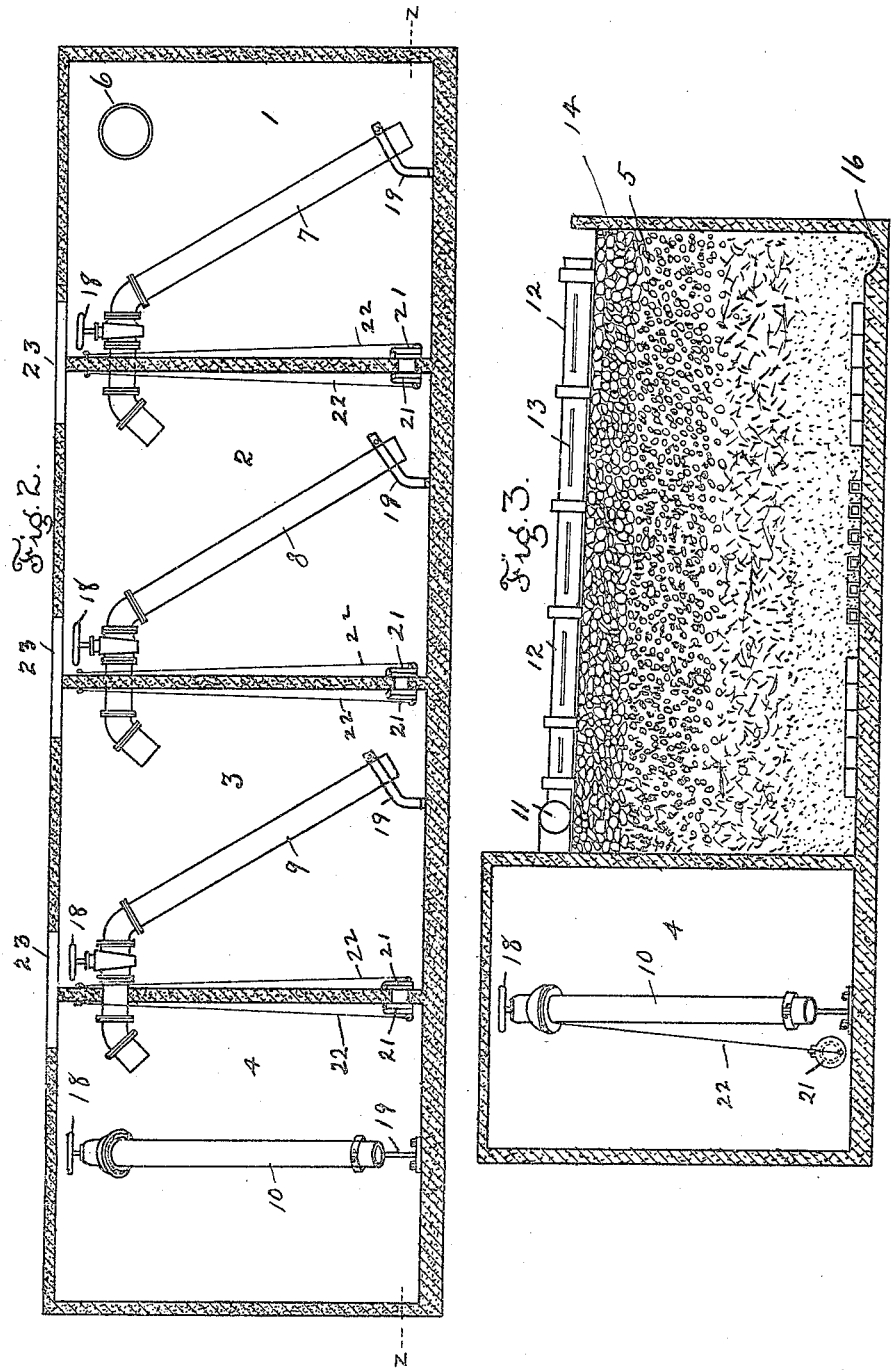

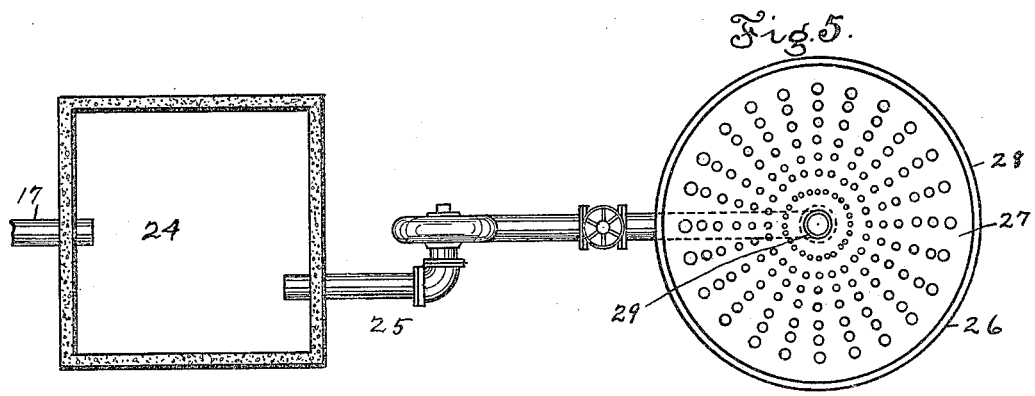
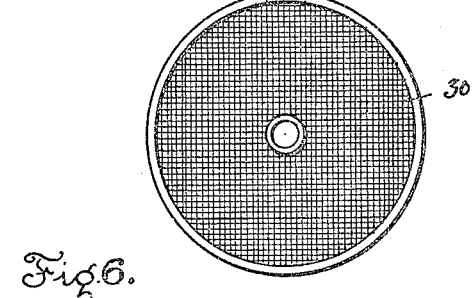
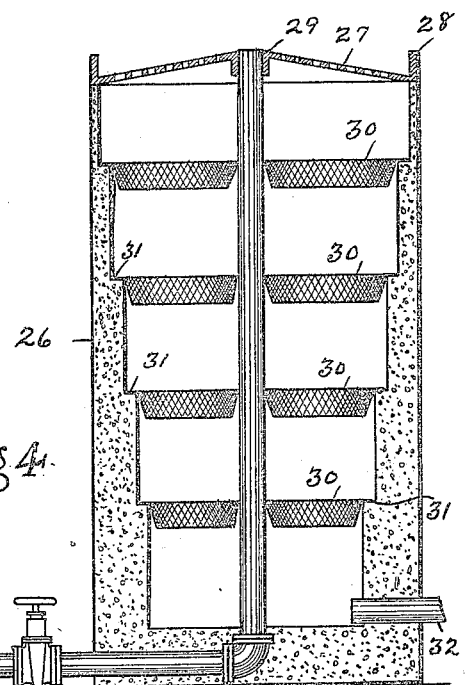
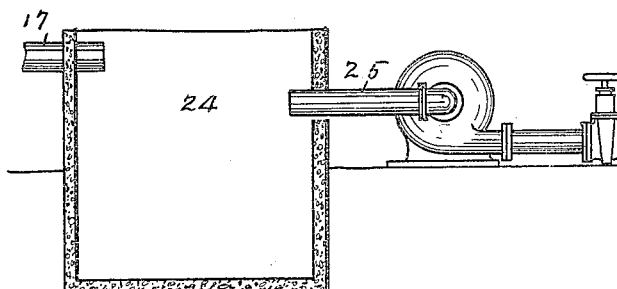

MARTIN J. WIEST, OF GOVANS, MARYLAND.

SEWAGE-DISPOSAL PLANT.

962,606.  Specification of Letters Patent.  Patented June 28, 1910.

Application filed August 2, 1909. Serial No. 510,760.

*To all whom it may concern:*

Be it known that I, MARTIN J. WIEST, a citizen of the United States, residing at Govans, in the county of Baltimore and State of Maryland, have invented certain new and useful Improvements in Sewage - Disposal Plants, of which the following is a specification.

This invention relates to improvements in sewage disposal plants.

The invention consists of the novel construction and arrangements of the parts and combination of parts hereinafter more fully set forth in the following specification and pointed out in detail in the claim.

In the accompanying drawings,—Figure 1 is a plan view of the asceptic bed and tanks, the latter being partly broken away. Fig. 2 is a vertical sectional view, on the line X—X, of Fig. 1. Fig. 3 is a vertical sectional view, on the line Y—Y, of Fig. 1. Fig. 4 is a vertical sectional view of the tank into which the water flows from the asceptic bed, and the tower into which the water is pumped for final purification. Fig. 5 is a top plan view of Fig. 4. Fig. 6 is a plan view of one of the removable screens of the water tower.

Referring to the accompanying drawings, forming part of this specification, and in which like reference numerals designate like parts throughout the several views thereof, 1 designates the sludge tank, and 2, 3, and 4 are similar tanks through which the water is passed to the asceptic bed 5. The sewage is brought in through the inlet pipe 6 and empties into the sludge tank 1 where the sludge, or solid matter, rises to the top of the water. The water is siphoned from near the bottom of the tank 1 into the tank 2 through the pipe 7, leaving the said sludge, or solid matter, in the tank 1 from which it can be removed and baked or otherwise disposed of. The water is likewise siphoned from the tank 2 to the tank 3, and from tank 3 to tank 4, through pipes 8 and 9, respectively. By the time the water reaches the tank 4 it is in a perfectly clear state. The water is then siphoned from the bottom of the tank 4 through the pipe 10 into the pipe 11, which latter extends along the asceptic bed 5 near the tanks 1, 2, 3 and 4. Connected with the pipe 11 are a number of distributing pipes 12 resting upon the crushed stone which forms the upper layer of the asceptic bed, and each of said pipes 12 is provided with elongated slots 13 through which the water is forced and sprayed over the said bed 5. The water is further purified by percolating through the crushed stone 14 and down through the different layers of gravel and sand until it reaches the soft tiles 15 through which it works its way to the gutter 16, and is carried off from the asceptic bed through the pipe 17 perfectly clear.

The pipes 7, 8, 9, and 10 are each provided with a valve 18 to control the flow of water passing therethrough, and are each provided with a support 19 at the lower end. The tanks 1, 2, 3 and 4 are each provided with a port 20 having a hinged valve 21 on each side adapted to be opened and closed by the rods 22, the upper ends of which latter terminate in handles near the manholes 23 in the top of said tanks. The ports may be opened for the purpose of allowing the water to flow from one tank to the other, or for flushing the said tanks.

The water is carried from the asceptic bed 5 through the pipe 17 to the tank 24, from which latter it is pumped through the pipe 25 to the top of the tower 26. As the water leaves the top of the pipe 25 it flows over a perforated hood 27, which latter is provided with a annular flange 28 on its outer edge to prevent the water flowing over the outside of the tower. The said hood 27 rests on the top of the tower 26 and is provided with a central aperture 29 which fits over the upper end of the pipe 25 and holds the said hood to its proper position. The perforations in the hood 27 are smaller near the center and increase toward the outer edge. Within the tower 26 are a number of removable screens 30 which rest in the annular shoulders 31 formed in the side of the tower. These screens may be filled with charcoal, or other substance, through which the water percolates and receives its final purification. The said screens may be removed by any suitable device. The water, as it leaves the pipe 25, flows through the perforated hood 27 and through the screens 30 to the bottom of the tower 26 and is carried off through the pipe 32 to any desired point.

Having thus described my invention, what I claim is:

A sewage disposal plant comprising a plurality of intercommunicating tanks, one of which has an outlet for the sewage, a pipe in each tank extending from near the bottom up into the next adjoining tank near the top thereof, valves in the partition walls of each tank, an asceptic bed having an outlet, and a number of apertured pipes arranged on top of said bed and having communication with one of said tanks.

In testimony whereof I affix my signature in presence of two witnesses.

MARTIN J. WIEST.

Witnesses:
J. FRED. CONRAD, Jr.
CHAPIN A. FERGUSON.